(12) United States Patent
Jungmann et al.

(10) Patent No.: US 12,103,462 B2
(45) Date of Patent: Oct. 1, 2024

(54) WINDSHIELD-REFLECTED INFRARED IMAGING OF VEHICLE OCCUPANT

(71) Applicant: Atieva, Inc., Newark, CA (US)

(72) Inventors: Lucas Jungmann, Newark, CA (US); Hans-Christoph Eckstein, Redwood City, CA (US); Mohannad Murad, Pleasanton, CA (US); Devan S. Shanker, Menlo Park, CA (US)

(73) Assignee: Atieva, Inc., Newark, CA (US)

( * ) Notice: Subject to any disclaimer, the term of this patent is extended or adjusted under 35 U.S.C. 154(b) by 43 days.

(21) Appl. No.: 17/645,422

(22) Filed: Dec. 21, 2021

(65) Prior Publication Data

US 2023/0192000 A1 Jun. 22, 2023

(51) Int. Cl.
| | |
|---|---|
| *B60R 1/29* | (2022.01) |
| *B60K 35/23* | (2024.01) |
| *B60K 35/40* | (2024.01) |
| *B60K 35/60* | (2024.01) |
| *B60R 1/30* | (2022.01) |

(52) U.S. Cl.
CPC ............... *B60R 1/29* (2022.01); *B60K 35/60* (2024.01); *B60R 1/30* (2022.01); *B60K 35/23* (2024.01); *B60K 35/415* (2024.01); *B60K 2360/25* (2024.01); *B60R 2300/103* (2013.01); *B60R 2300/105* (2013.01); *B60R 2300/8006* (2013.01)

(58) Field of Classification Search
CPC ....... B60R 1/29; B60R 1/30; B60R 2300/103; B60R 2300/105; B60R 2300/8006; B60K 37/02; B60K 2370/1529; B60K 2370/25; B60K 2370/37

See application file for complete search history.

(56) References Cited

U.S. PATENT DOCUMENTS

| | | | |
|---|---|---|---|
| 9,440,604 B2 | 9/2016 | Graham | |
| 10,277,837 B2 | 4/2019 | Madau et al. | |
| 2004/0033675 A1* | 2/2004 | Fleming | B32B 17/10036 525/326.3 |
| 2006/0257140 A1* | 11/2006 | Seger | H04N 7/18 348/E5.09 |
| 2009/0092284 A1 | 4/2009 | Breed et al. | |
| 2013/0076885 A1 | 3/2013 | Kobetski et al. | |

(Continued)

FOREIGN PATENT DOCUMENTS

WO 2020183844 A1 9/2020

OTHER PUBLICATIONS

International Search Report and Written Opinion for PCT Application No. PCT/US2022/081954, mailed on Apr. 12, 2023, 16 pages.

*Primary Examiner* — Farzana Hossain (74) *Attorney, Agent, or Firm* — Brake Hughes Bellermann LLP (57) ABSTRACT

An occupant monitoring system for a vehicle comprises: a first light source to generate first infrared (IR) light illuminating at least part of the body of an occupant of a vehicle, wherein the first light source is time modulated with a duty cycle; an IR reflective surface to reflect second IR light reflected from the body of the occupant; and a first IR camera to receive at least part of the second IR light reflected by the IR reflective surface, wherein the first IR camera is time modulated with the duty cycle of the first light source.

31 Claims, 7 Drawing Sheets

(56) References Cited

U.S. PATENT DOCUMENTS

| | | | |
|---|---|---|---|
| 2014/0333663 A1* | 11/2014 | Yamada | G02B 27/01 |
| | | | 345/629 |
| 2020/0290513 A1* | 9/2020 | Karafin | G06F 3/1446 |
| 2020/0319304 A1* | 10/2020 | Pan | G01S 17/931 |
| 2020/0331486 A1 | 10/2020 | Wieczorek et al. | |
| 2020/0371351 A1 | 11/2020 | Chang et al. | |
| 2021/0362476 A1* | 11/2021 | Li | B60J 1/001 |
| 2022/0070353 A1* | 3/2022 | Wester | H04N 23/74 |

* cited by examiner

WINDSHIELD-REFLECTED INFRARED IMAGING OF VEHICLE OCCUPANT

TECHNICAL FIELD

This disclosure relates to vehicle occupant monitoring.

BACKGROUND

In vehicles (e.g., cars, trucks, etc.) ensuring that drivers or other passengers can be observed is becoming increasingly relevant. This is typically done for safety enhancement, such as to monitor driver drowsiness and distractedness while driving.

SUMMARY

In an aspect, an occupant monitoring system for a vehicle comprises: a first light source to generate first infrared (IR) light illuminating at least part of the body of an occupant of a vehicle, wherein the first light source is time modulated with a duty cycle; an IR reflective surface to reflect second IR light reflected from the body of the occupant; and a first IR camera to receive at least part of the second IR light reflected by the IR reflective surface, wherein the first IR camera is time modulated with the duty cycle of the first light source.

Implementations can include any or all of the following features. The occupant monitoring system further comprises an occupant monitoring component that processes an output of the first IR camera. The occupant monitoring component performs distortion compensation to the output. The output of the first IR camera covers all front-row passengers of the vehicle. The first IR camera has a fisheye lens. The occupant monitoring system further comprises: a second light source to generate third IR light illuminating at least part of the body of the occupant, wherein each of the first and third IR light includes a dot pattern; and a second IR camera to receive fourth IR light reflected by the IR reflective surface, wherein the occupant monitoring component processes a three-dimensional image of the occupant based on the second and fourth IR lights. At least the first IR camera is centrally positioned in a transverse direction of an instrument panel of the vehicle. At least the first IR camera is off-centrally positioned in a transverse direction of an instrument panel of the vehicle. The off-central position is aligned with the occupant in the transverse direction of the instrument panel. The occupant is a driver of the vehicle, and wherein the off-central position is aligned with a passenger in the transverse direction of the instrument panel. The IR reflective surface is positioned at a location on a windshield of the vehicle. The IR reflective surface comprises a film or coating applied to the windshield. The film or coating is a thermal control film or coating applied to the windshield. The vehicle includes a head-up display (HUD) system, and wherein the HUD system presents a HUD at the location on the windshield. The first light source is an IR light source. The first light source is a vertical-cavity surface-emitting laser (VCSEL), wherein the VCSEL generates non-IR light together with the first IR light, the occupant monitoring system further comprising a filter for the first IR camera to remove reflections of the non-IR light. The occupant monitoring system further comprises a curved cover lens for the IR camera. At least the first IR camera is installed at an instrument panel of the vehicle. The first IR camera is installed in a well of the instrument panel, the well facing toward a windshield of the vehicle. The occupant monitoring system further comprises flocking or a glare trap in the well. The vehicle has a display device mounted to the instrument panel so that the display device floats from the instrument panel, and wherein the display device blocks a view of the first IR camera for the occupant. The duty cycle consists of a pulse that extends for less than about 5% of a duration of the duty cycle. The first IR light is polarized. The first IR light comprises a pseudorandom point pattern. The first IR camera is inside or on an instrument panel of the vehicle, and wherein the first light source is positioned elsewhere inside the vehicle than at the instrument panel. The occupant monitoring system is configured for adjusting a field of view of the first IR camera based on a height of the occupant. The IR reflective surface includes a surface of the vehicle other than a windshield. The occupant monitoring system is configured for changing an aspect regarding the first IR light or the IR reflective surface. The occupant monitoring system changes an intensity of the first IR light, or a tint of the IR reflective surface. The occupant monitoring system changes the aspect based on at least one of weather information, map information, a navigation signal, or an output of an exterior camera of the vehicle.

BRIEF DESCRIPTION OF DRAWINGS

Like reference symbols or numerals in the various drawings indicate like elements.

DETAILED DESCRIPTION

Systems and methods (collectively occupant monitoring systems) that monitor an occupant of a vehicle for one or more purposes are described herein. The present disclosure exemplifies inobtrusive occupant monitoring camera systems that can almost always capture a clear and unblocked image of an occupant. An infrared (IR) camera and reflective coating on a windscreen can be paired to make use of folded optics principles to capture occupant images reflected on the windshield with a camera system placed within or behind the instrument panel pointed towards the windscreen. Such approaches can allow the camera system to be out of sight by the occupant while allowing for efficient occupant monitoring, and can allow use of an existing occupant monitoring system that was designed for being placed with a direct (e.g., non-reflected) view of the occupant. One or more aspects of the system can be designed to eliminate or reduce capture of ambient light (e.g., direct sunlight) by the system. In some implementations, a high pulse intensity, short duration, gated exposure to the IR camera can ensure effective occupant monitoring throughout a range of ambient circumstances. The gain in field of view from pointing the camera in the windshield can allow all front occupants of the vehicle to be monitored and can eliminate or reduce image occlusions from driver and steering wheel movements.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether or to what extent the person is driving the vehicle, or whether the person has access to all or only some of the controls for driving the vehicle, or whether the person lacks controls for driving the vehicle. The terms windscreen and windshield are interchangeable with each other as used in the present disclosure and refer to a transparent pane (e.g., flat or curved) that is positioned at least in front of the front-row occupant(s). For example, a windscreen/windshield can continuously extend above the front-row seats and be part of a roof of the vehicle.

Examples herein refer to a vertical-cavity surface-emitting laser (VCSEL). As used herein, a VCSEL includes any semiconductor laser diode that emits a laser beam perpendicular to its top surface. The VCSEL can include two mirrors (e.g., distributed Bragg reflector mirrors) parallel to a wafer surface. For example, the mirrors can be doped as p-type and n-type materials. One or more quantum wells can be formed by the wafer between the mirrors for laser light generation. In some implementations, a gallium arsenide wafer (e.g., including indium gallium arsenide) can be used.

Examples herein refer to an IR camera. As used herein, an IR camera includes any image sensor that detects electromagnetic radiation at least within the IR range. In some implementations, an IR camera can register images at least within a wavelength range of about 700-14000 nanometers (nm). For example, the IR camera can register images in one or more of the following ranges: about 700 nm to about 800 nm; about 800 nm to about 900 nm; about 900 nm to about 1000 nm; about 1000 nm to about 1500 nm; about 1500 nm to about 2000 nm; about 2000 nm to about 3000 nm; about 3000 nm to about 10000 nm; or about 10000 nm to about 14000 nm; or combinations thereof. The output of the IR camera can be an image where the pixel elements are coded according to the wavelength of the received radiation.

Examples herein refer to an IR reflective surface. As used herein, an IR reflective surface includes any surface that reflects at least a threshold fraction of incited IR light. In some implementations, the threshold fraction can be about 20%. In some implementations, an IR film or IR coating can be applied to a windshield to reflect about 75-80% of IR light. The IR film/coating can be applied to an outside surface, and/or an inside surface, and/or in between layers of the windshield. The IR film/coating can include one or more layers of a metal material. Multiple layers including silver can be used, to name just one example. The IR reflective surface can be provided for purposes of occupant monitoring only, or can additionally serve one or more other purposes (e.g., thermal control of a passenger compartment).

Figure 1:
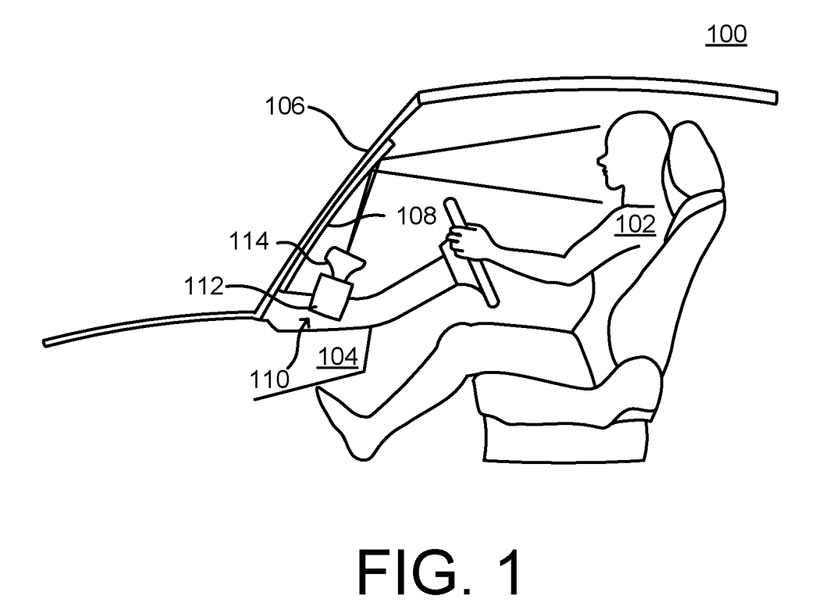
FIG. 1 schematically shows an example of windshield-reflected infrared (IR) imaging of an occupant in a vehicle.

FIG. 1 schematically shows an example of windshield-reflected IR imaging of an occupant in a vehicle 100. The vehicle 100 or components thereof can be used with one or more other examples described elsewhere herein. Only part of the vehicle 100 is here shown, in a partial cross section. An occupant 102 is positioned in a passenger compartment of the vehicle 100. In some implementations, the occupant 102 is situated in a front-row seat. For example, the occupant 102 can be a driver of the vehicle 100.

The vehicle 100 includes an instrument panel 104 and a windshield 106. An IR reflective surface 108 is positioned at a location on the windshield 106. For example, the location is in the normal direction of view for the occupant 102. The IR reflective surface 108 can comprise a film applied to the windshield 106. For example, the film can be a thermal control film applied to an entirety of the windshield 106.

The vehicle 100 includes an occupant monitoring system 110 that can operate by detecting reflected IR light from the occupant 102. The IR light can be generated by a light source (not shown). For example, the light source can generate only IR light, or can generate both IR light and non-IR light. The occupant monitoring system 110 includes an IR camera 112 that receives at least some of the IR light reflected by the IR reflective surface 108. For example, the IR camera 112 can be provided with a filter 114 that is transmissive to IR light. The occupant monitoring system 110 can be configured in one or more ways to reduce or eliminate the influence of ambient light on the occupant monitoring performed by the IR camera 112, including, but not limited to, as exemplified below with reference to other illustrations.

Figure 2:
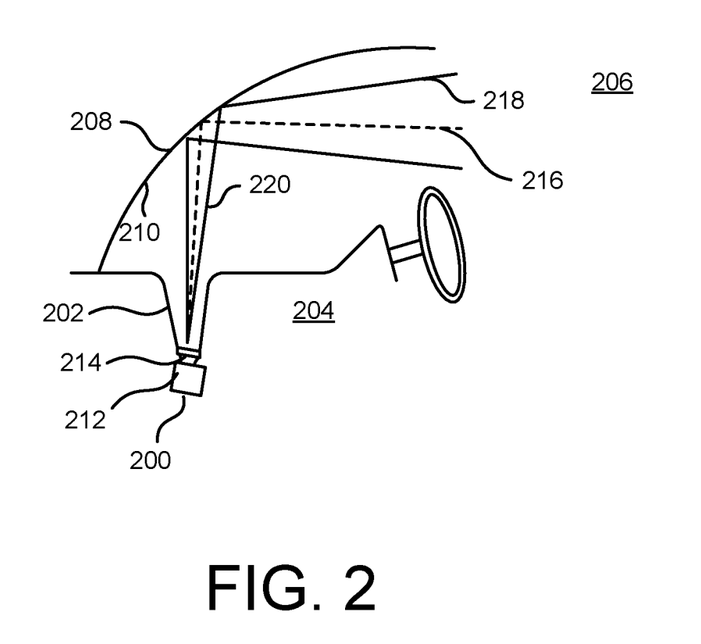
FIG. 2 schematically shows an example of an occupant monitoring system installed in a well of an instrument panel of a vehicle.

FIG. 2 schematically shows an example of an occupant monitoring system 200 installed in a well 202 of an instrument panel 204 of a vehicle 206. The occupant monitoring system 200 or components thereof can be used with one or more other examples described elsewhere herein. The vehicle 206 includes a windshield 208. The well 202 faces toward the windshield 208. An IR reflective surface 210 is positioned at a location on the windshield 208. For example, the location is in the normal direction of view for an occupant of the vehicle 206. The IR reflective surface 210 can comprise a film applied to the windshield 208. For example, the film can be a thermal control film applied to an entirety of the windshield 208.

The occupant monitoring system 200 can operate by detecting reflected IR light from the occupant. The IR light can be generated by a light source of the occupant monitoring system 200. For example, the light source can generate only IR light, or can generate both IR light and non-IR light. The occupant monitoring system 200 includes an IR camera 212 that receives at least some of the IR light reflected by the IR reflective surface 210. For example, the IR camera 212 can be provided with a filter 214 that is transmissive to IR light.

In operation, the light source can generate IR light 216 which is here schematically illustrated using a dotted line. For example, the IR light 216 can be reflected at the IR reflective surface 210 to illuminate at least part of the body of the occupant(s). IR light 218 arriving from the occupant (e.g., from the person's face or other part of the body) can be incident at the IR reflective surface 210. IR light 220 that is reflected at the IR reflective surface 210 can be received by the IR camera 212.

The occupant monitoring system 200 can be configured in one or more ways to reduce or eliminate the influence of ambient light on the occupant monitoring performed by the IR camera 212. Such configuration can include, but is not limited to, a glare trap inside the well 202. For example, flocking can be provided inside the well 202.

Figure 3:
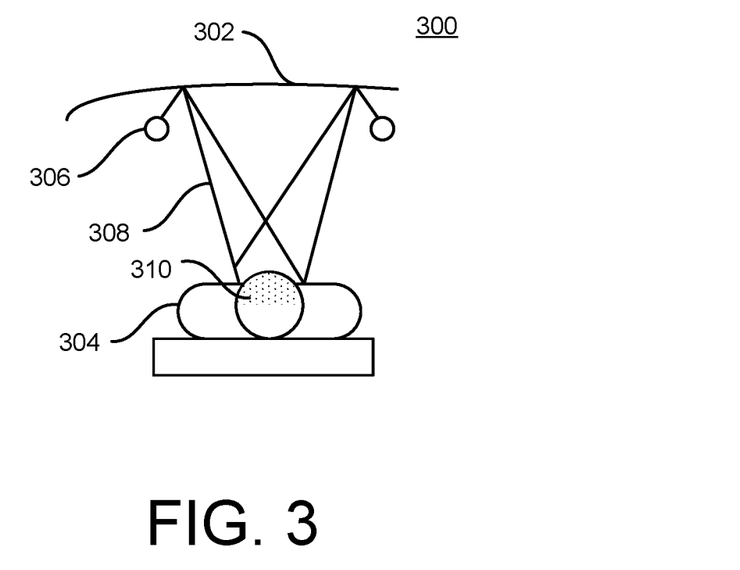
FIG. 3 schematically shows an example of performing three-dimensional imaging with IR cameras.

FIG. 3 schematically shows an example of performing three-dimensional (3D) imaging with IR cameras. The example is described with reference to a vehicle 300 that is partially shown, in a view from above. The vehicle 300 or components thereof can be used with one or more other examples described elsewhere herein. The vehicle 300 has an IR reflective surface 302. For example, the IR reflective surface 302 can be a windshield. An occupant 304 is positioned in the vehicle 300.

Multiple IR cameras can be used in the vehicle 300. Here, two IR cameras 306 are shown. The IR cameras 306 can be positioned symmetrically with respect to the occupant 304. In some implementations, either or both of the IR cameras 306 can also include an (IR) light source. The light source can illuminate the occupant 304 with homogeneous IR light, or with structured IR light. A light cone 308 here schematically represents light from the IR cameras 306 that is incident on the occupant 304, as well as IR light reflected by the occupant 304 for receipt by the IR cameras 306. In some implementations, a dot pattern 310 of IR light can be generated on the occupant 304. For example, a pseudorandom point pattern can be used. This can allow the occupant monitoring system to process a 3D image of the occupant 304.

Figure 4:
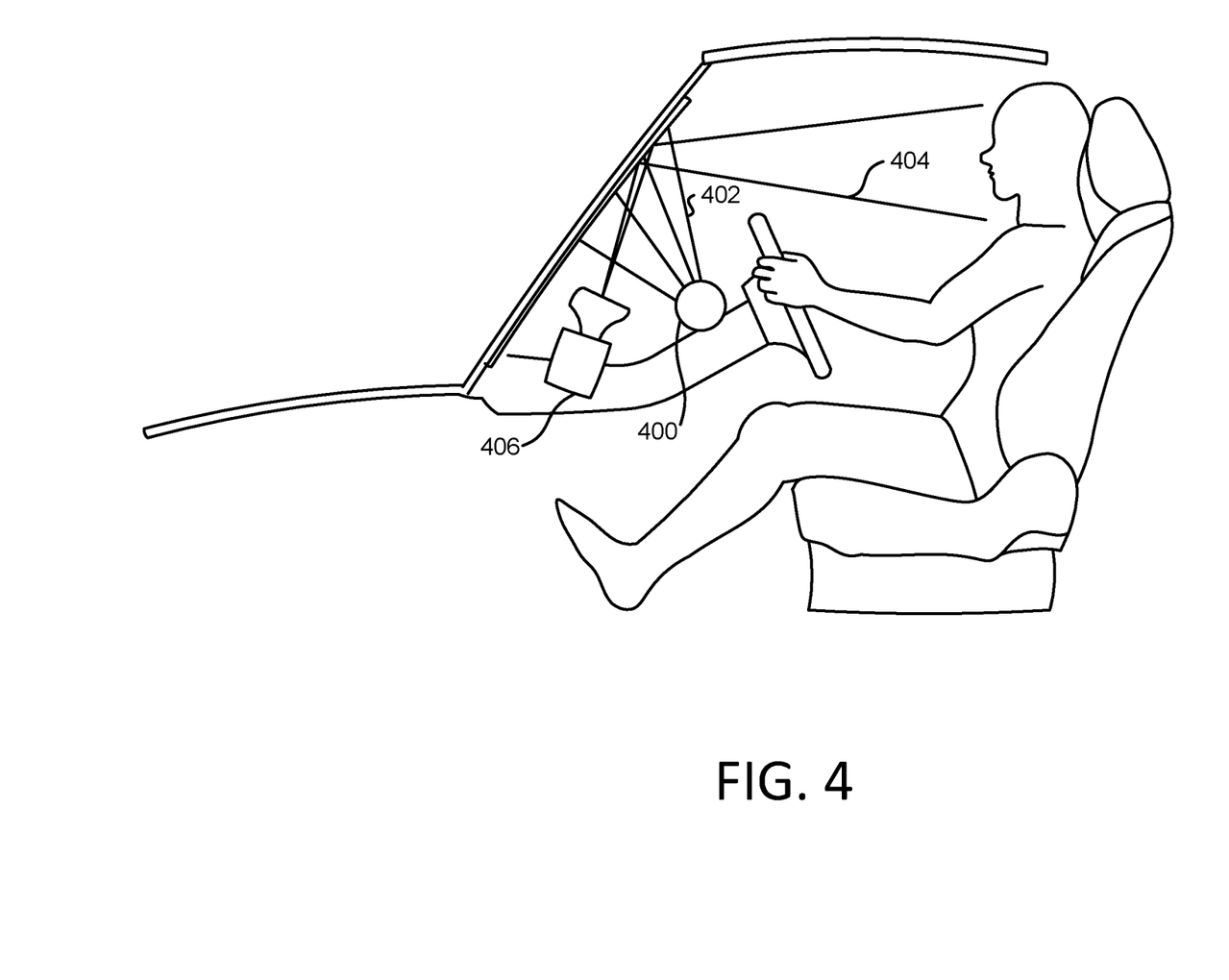
FIG. 4 schematically shows an example of a head-up display (HUD) system presenting a HUD at a location on a windshield where IR light is also reflected.

FIG. 4 schematically shows an example of a head-up display (HUD) system 400 presenting a HUD 402 at a location on a windshield where IR light 404 is also reflected. The HUD system 400 or components thereof can be used with one or more other examples described elsewhere herein. The vehicle also includes an occupant monitoring system 406 that can operate using the IR light 404. As such, the same location of the windshield where the HUD 402 is presented can be used for reflecting the IR light 404. For example, the IR light 404 can be reflected as part of propagating from the occupant monitoring system 406 toward the occupant, or as part of propagating from the occupant toward the occupant monitoring system 406, or both.

Figure 5:
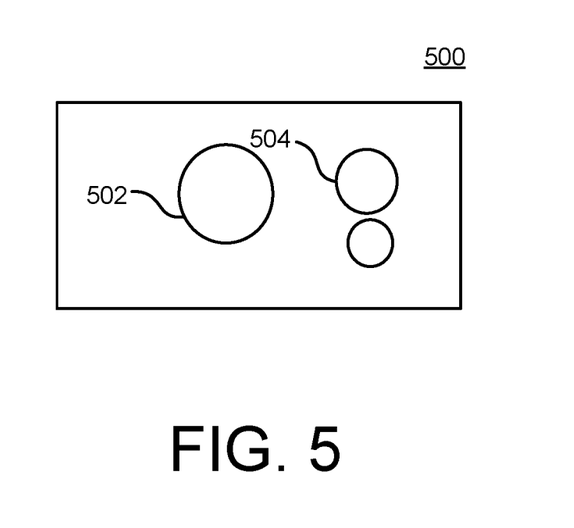
FIG. 5 shows an example exterior of an occupant monitoring system.

FIG. 5 shows an example exterior of an occupant monitoring system 500. The occupant monitoring system 500 can be used with one or more other examples described elsewhere herein. The occupant monitoring system 500 includes a lens 502. For example, the lens 502 represents one or more pieces of optics that are at least partially transparent to IR light (e.g., to perform focusing and/or dispersion of a light beam). In some implementations, a sensor can be positioned inward of the lens 502. For example, the sensor can include an IR sensor. The occupant monitoring system 500 includes one or more light sources 504. For example, the light source(s) 504 can generate only IR light, or can generate both IR light and non-IR light.

Figure 6:
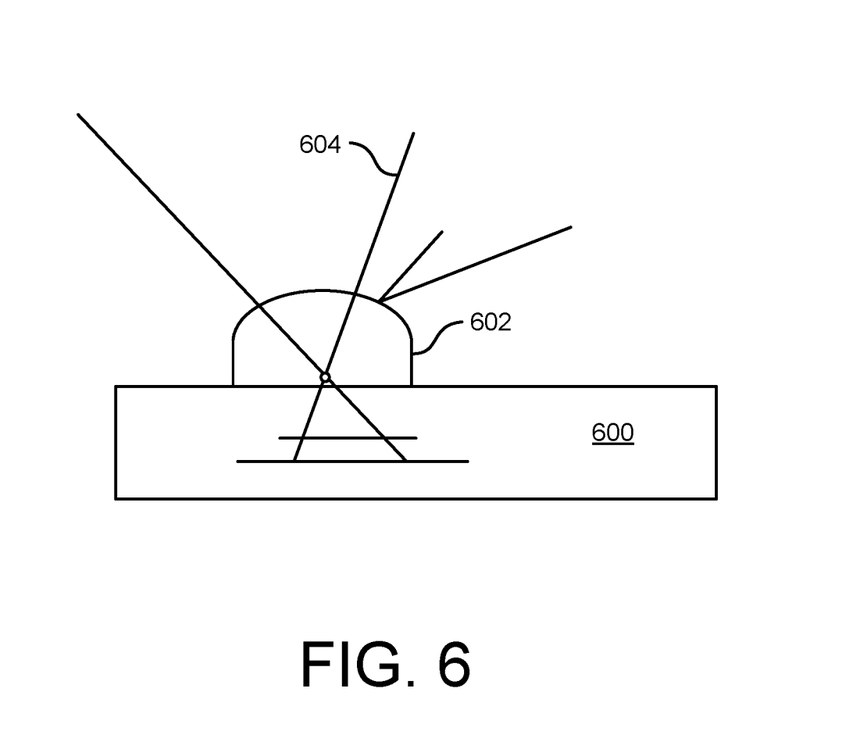
FIG. 6 shows an example of an occupant monitoring system with a curved lens.

FIG. 6 shows an example of an occupant monitoring system 600 with a lens 602. The occupant monitoring system 600 and/or the lens 602 can be used with one or more other examples described elsewhere herein. The lens 602 can provide optical conditioning of IR light 604 propagating out of, and/or into, the occupant monitoring system 600. For example, the lens 602 can be a curved lens. As another example, the lens 602 can eliminate or resist reflections generated by the entrance optics. For example, this can be done to make the occupant monitoring system 600 less noticeable to an occupant of the vehicle. In some implementations, the lens 602 is a fisheye lens. This can be done to provide a wider (e.g., a distorted) field of view to capture more than one occupant in the vehicle. For example, all front-row occupants can be covered by the occupant monitoring system 600. As another example, one or more second-row occupants can be covered.

Figure 7:
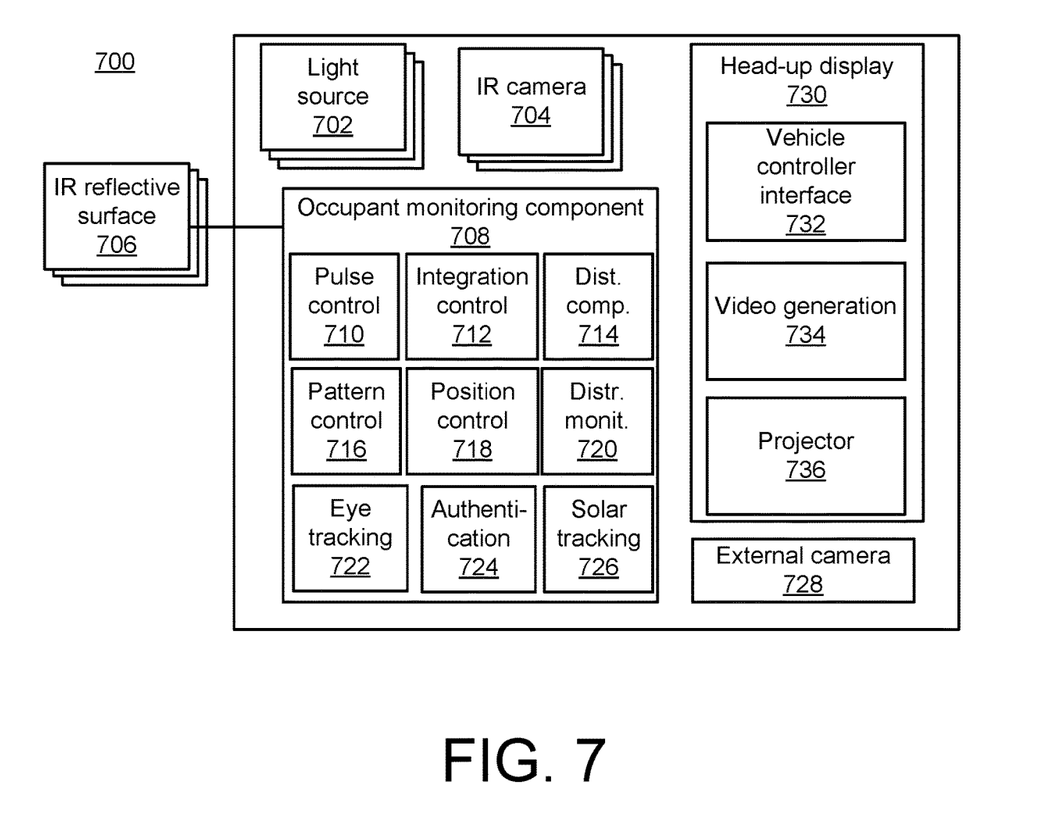
FIG. 7 shows an example of an occupant monitoring system.

FIG. 7 shows an example of an occupant monitoring system 700. The occupant monitoring system 700 or components thereof can be used with one or more other examples described elsewhere herein. The occupant monitoring system 700 can be implemented using one or more aspects described below with reference to FIG. 12. For example, components can be implemented by one or more processors executing instructions stored in a computer-readable medium.

The occupant monitoring system 700 includes one or more light sources 702. The light sources 702 can generate only IR light, or can generate both IR light and non-IR light. For example, the light sources 702 can generate polarized light (e.g., an IR light source generating polarized IR light). One or more of the light sources 702 can be oriented to directly face toward an occupant (e.g., without intermediate reflection of the light). One or more of the light sources 702 can be oriented to indirectly face toward an occupant (e.g., with at least one intermediate reflection of the light).

The occupant monitoring system 700 includes one or more IR cameras 704. The IR cameras 704 can be sensitive to IR light in one or more wavelength ranges. At least one of the IR cameras 704 can include a laser and/or a light-emitting diode. In some implementations, a VCSEL can be used. For example, an overcurrent can be provided so that the VCSEL operates at a significantly higher effect than its rating for continuous output, provided that the high-effect operation occurs during only a minimal amount of the duty cycle. If the average power is about 0.5 W, a peak power of about 50 W can be provided if the pulse occurs only during about 1% of the total time. In some implementations, the IR cameras 704 can be provided with a filter that is transmissive to IR light.

The occupant monitoring system 700 includes an IR reflective surface 706 that reflects IR light from the occupant toward at least one of the IR cameras 704. In some implementations, the IR reflective surface 706 can include a surface that already exists in the vehicle (e.g., that serves as a structural or decorative component). In some implementations, the IR reflective surface 706 can include a coating (e.g., a film or other surface treatment) applied for the purpose of providing IR reflection. For example, the IR reflective surface 706 can include a windshield, side window, sunroof, moonroof, or any other surface (e.g., an opaque surface) of the vehicle that reflects IR light.

The occupant monitoring system 700 includes an occupant monitoring component 708 that processes an output of the one or more IR cameras 704. For example, the occupant monitoring component 708 can generate an output (e.g., a reminder or alert) and/or take corrective action depending on the result of the occupant monitoring. In some implementations, the occupant monitoring component 708 includes a pulse control component 710 that can control output of light by the light sources 702. For example, a duty cycle can include a high pulse intensity for a short time duration to mitigate influence of ambient light. In some implementations, the occupant monitoring component 708 includes an integration control component 712 that can control the integration of received radiation by the one or more IR cameras 704. For example, the integration control component 712 can provide a duty cycle of gated exposure that mitigates influence of ambient light.

In some implementations, the occupant monitoring component 708 includes a distortion compensation component 714 that can compensate for a nonplanar IR reflective surface. For example, when the IR cameras 704 receive IR light reflected off a windshield that is curved, the distortion compensation component 714 can perform image processing of the received image to remove some or all distortion.

In some implementations, the occupant monitoring component 708 includes a pattern control component 716 that can facilitate illumination of the occupant with non-homogeneous (e.g., structured) IR light. For example, the pattern control component 716 can generate a dot pattern (e.g., a pseudorandom point pattern) by the IR light source 702.

In some implementations, the occupant monitoring component 708 includes a position control component 718 that can adjust the IR light incident on the occupant. The position control component 718 can adjust a field of view of the IR cameras 704 based on a height of the occupant. For example, the image received by the IR camera 704 can indicate whether the occupant is properly positioned within the field of view, and if not, the position control component 718 can perform adjustment accordingly.

In some implementations, the occupant monitoring component 708 includes a distraction monitoring component 720 that can analyze image output of the IR camera 704 to detect whether the occupant (e.g., a driver) is distracted or inattentive (e.g., by directing their attention elsewhere than on controlling the vehicle). The distraction monitoring component 720 can take into account output of an eye tracking component 722 (e.g., that analyzes the IR images to determine where the occupant's eyes are directed.)

The occupant monitoring component 708 can include an authentication component 724 that can perform one or more authentications with regard to the occupant. The authentication component 724 can monitor one or more actions performed by the occupant. In some implementations, authentication can be performed prior to driving the vehicle. For example, the authentication can ensure that the occupant is authorized to drive/occupy the vehicle, and/or can be used for activating or deactivating occupant-specific vehicle settings. As another example, authentication can be performed for making purchases through a computer system of the vehicle. As another example, authentication can reflect whether a particular vehicle seat is occupied (e.g., for purposes of airbag activation or deactivation).

The occupant monitoring component 708 can change one or more aspects of the occupant monitoring. In some implementations, the aspect involves the light source 702 and/or the IR reflective surface 706. For example, an intensity of the (IR) light or a tint of the IR reflective surface 706 (e.g., liquid crystals in a film on a window can be controlled to increase or decrease the transparency). A solar tracking component 726 can be used to track when circumstances may warrant changing the IR illumination. For example, the solar tracking component 726 can access an online resource that provides local weather conditions (e.g., whether sunlight is bright). As another example, the solar tracking component 726 can correlate vehicle position with a map to determine whether sunlight is likely incident on the IR camera 704. As another example, the solar tracking component 726 can use a navigation signal (e.g., from a global positioning system and/or a global navigation satellite system) to determine whether sunlight is likely incident on the IR camera 704. As another example, the solar tracking component 726 can use output of an external camera 728 of the vehicle to determine whether sunlight is likely incident on the IR camera 704.

The occupant monitoring system 700 can be integrated with a HUD system 730. Here, the occupant monitoring system 700 and the HUD system 730 are shown as being part of a common system. The HUD system 730 can include a vehicle controller interface 732 (e.g., to receive information to be presented in the HUD from a vehicle controller). The HUD system 730 can include a video generation component 734 (e.g., to dynamically generate image content for the HUD). The HUD system 730 can include a projector 736 (e.g., to project and update the HUD on a windshield). Such integration can provide that a HUD is presented at a location on a windshield where IR light for the occupant monitoring system 700 is also reflected.

Figure 8:
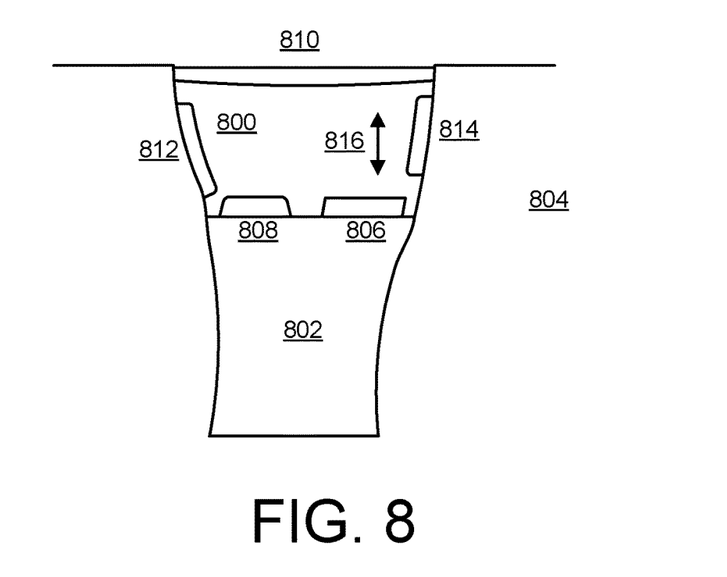
FIG. 8 shows an example of a well with an occupant monitoring system in an instrument panel of a vehicle.

FIG. 8 shows an example of a well 800 with an occupant monitoring system 802 in an instrument panel 804 of a vehicle. The well 800 or components thereof can be used with one or more other examples described elsewhere herein. The well 800 can face toward a windshield of the vehicle. The occupant monitoring system 802 can include a light source 806 and an IR camera 808. The well 800 can be protected by a cover 810 (e.g., transparent to IR light). The well 800 can include a glare trap 812 inside the well. For example, flocking 814 can be provided in the well 800. An arrow 816 schematically illustrates that the occupant monitoring system 802 can be adjusted. For example, a height of the occupant monitoring system 802 and/or a field of view of the IR camera 808 can be adjusted.

Figure 9:
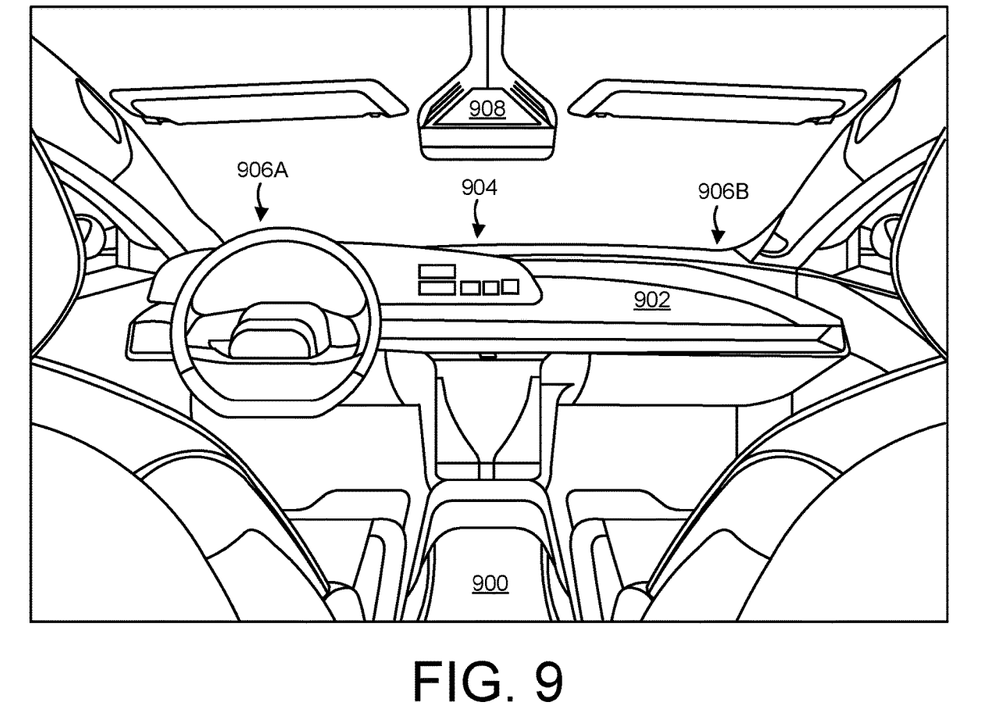
FIG. 9 shows an example of a passenger compartment of a vehicle with an instrument panel.

FIG. 9 shows an example of a passenger compartment 900 of a vehicle with an instrument panel 902. The passenger compartment 900 or components thereof can be used with one or more other examples described elsewhere herein. The passenger compartment 900 facilitates seating by at least two occupants in a front row. An occupant monitoring system can be configured so that an IR camera covers one or more (e.g., all) of the front-row passengers of the vehicle. An arrow 904 schematically illustrates that the occupant monitoring system (e.g., an IR camera thereof) can be centrally positioned in a transverse direction of the instrument panel 902 of the vehicle. Arrows 906A-906B schematically illustrate that the occupant monitoring system (e.g., an IR camera thereof) can be off-centrally positioned in the transverse direction of the instrument panel 902 of the vehicle. For example, the arrow 906A can correspond to the IR camera being aligned with an occupant in a left front seat. As another example, the arrow 906B can correspond to the IR camera being aligned with an occupant in a right front seat. With either the arrows 906A or 906B, the off-central position can be aligned with a passenger, other than the driver of the vehicle, in the transverse direction of the instrument panel. For example, the arrow 906B can be aligned with a front-row passenger in a left-side drive vehicle; the arrow 906A can be aligned with a front-row passenger in a right-side drive vehicle.

The position of the occupant monitoring system (e.g., of an IR camera thereof) can be selected to mitigate the influence of ambient light (e.g., sunlight). For example, a rear view mirror 908 mounted to the windshield may provide a blackout area over part of the instrument panel 902 that can guide the placement of the occupant monitoring system.

The light source(s) for the occupant monitoring system can be positioned according to any of the arrows 904, 906A, or 906B, or elsewhere in the vehicle than at the instrument panel 902 (e.g., at an A-pillar of the passenger compartment 900).

The passenger compartment 900 can have one or more IR reflective surfaces. For example, a windshield can be used. As another example, a side window, moonroof/sunroof, and/or any other opaque surface of the passenger compartment 900 can be used.

Figure 10:
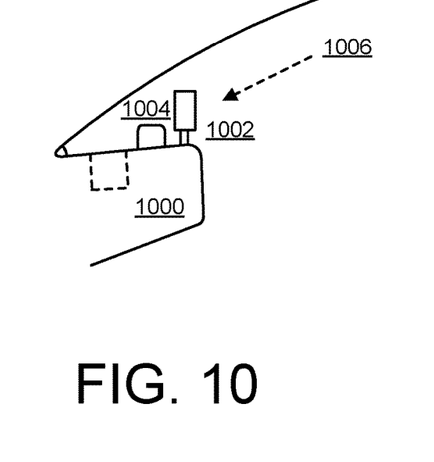
FIG. 10 shows an example of a vehicle instrument panel with a display device that floats from the instrument panel.

FIG. 10 shows an example of a vehicle instrument panel 1000 with a display device 1002 that floats from the vehicle instrument panel 1000. The vehicle instrument panel 1000 or components thereof can be used with one or more other examples described elsewhere herein. The display device 1002 can be mounted to the vehicle instrument panel 1000 so that the display device 1002 floats from the vehicle instrument panel 1000. In some implementations, the display device 1002 is self-contained and is not embedded within (e.g., not positioned flush with, or sunk into) the vehicle instrument panel 1000. For example, the display device 1002 is positioned in front of and/or above the vehicle instrument panel 1000 (e.g., standing on its own base).

An occupant monitoring system 1004 can be mounted either embedded into the vehicle instrument panel 1000 (shown in a dashed outline, such as in a well thereof), or can be mounted onto an exterior surface of the vehicle instrument panel 1000 (e.g., as shown in a solid outline). An arrow 1006 indicates that the display device 1002 blocks a view of the occupant monitoring system 1004 for an occupant of the vehicle.

Figure 11:
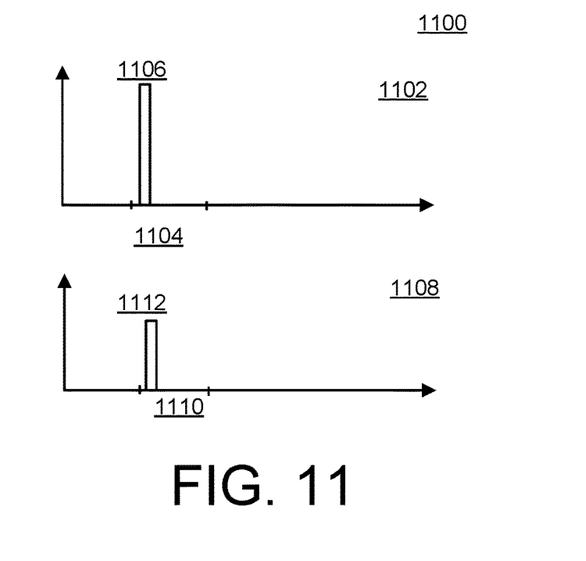
FIG. 11 shows examples of duty cycles for a light source and an IR camera.

FIG. 11 shows examples 1100 of duty cycles for a light source and an IR camera. The examples 1100 can be used with one or more other examples described elsewhere herein. A graph 1102 shows light generation (e.g., by an IR light source) on a vertical axis as a function of time on a horizontal axis. The time can be divided into duty cycles 1104. For example, each of the duty cycles 1104 can be a fraction of a second (including, but not limited to, about 30 milliseconds (ms)). A pulse 1106 of the light generation occurs for only a fraction of the duty cycle 1104 (including, but not limited to, for about 1 ms thereof). In some implementations, the light source (e.g., a laser, such as a VCSEL) can be rated for continuous average output of about 0.5 W, and the pulse 1106 can have a magnitude of about 50 W.

A graph 1108 shows camera image integration on a vertical axis as a function of time on a horizontal axis. The time can be divided into duty cycles 1110. For example, each of the duty cycles 1110 can be a fraction of a second (including, but not limited to, about 30 ms). The duty cycles 1110 of the graph 1108 can correspond to the duty cycles 1104 of the graph 1102. A pulse 1112 of camera image integration occurs for only a fraction of the duty cycle 1110 (including, but not limited to, for about 1 ms thereof). In some implementations, during a second of time, the camera integrates for only about 30 ms, which is about 3% of the time. For example, the pulse 1106 and/or 1112 can extend for less than about 5% of the duration of the corresponding duty cycle. This can correspond to only integrating about 3% of the ambient light, while capturing about 100% of the light generated by the pulses 1106.

Examples described herein illustrate examples showing that an occupant monitoring system for a vehicle can include a first light source (e.g., the light sources 702 in FIG. 7) to generate first IR light (e.g., the IR light 216 in FIG. 2) illuminating at least part of the body of an occupant of a vehicle. The first light source is time modulated with a duty cycle (e.g., as shown in the graph 1102 of FIG. 11). The occupant monitoring system can include an IR reflective surface (e.g., the IR reflective surface 706 in FIG. 7) to reflect second IR light (e.g., the IR light 218 in FIG. 2) reflected from the body of the occupant. The occupant monitoring system can include a first IR camera (e.g., the IR camera 704 in FIG. 7) to receive at least part of the second IR light reflected by the IR reflective surface (e.g., the IR light 220 in FIG. 2). The first IR camera is time modulated with the duty cycle of the first light source (e.g., as shown in the graph 1108 of FIG. 11).

Figure 12:
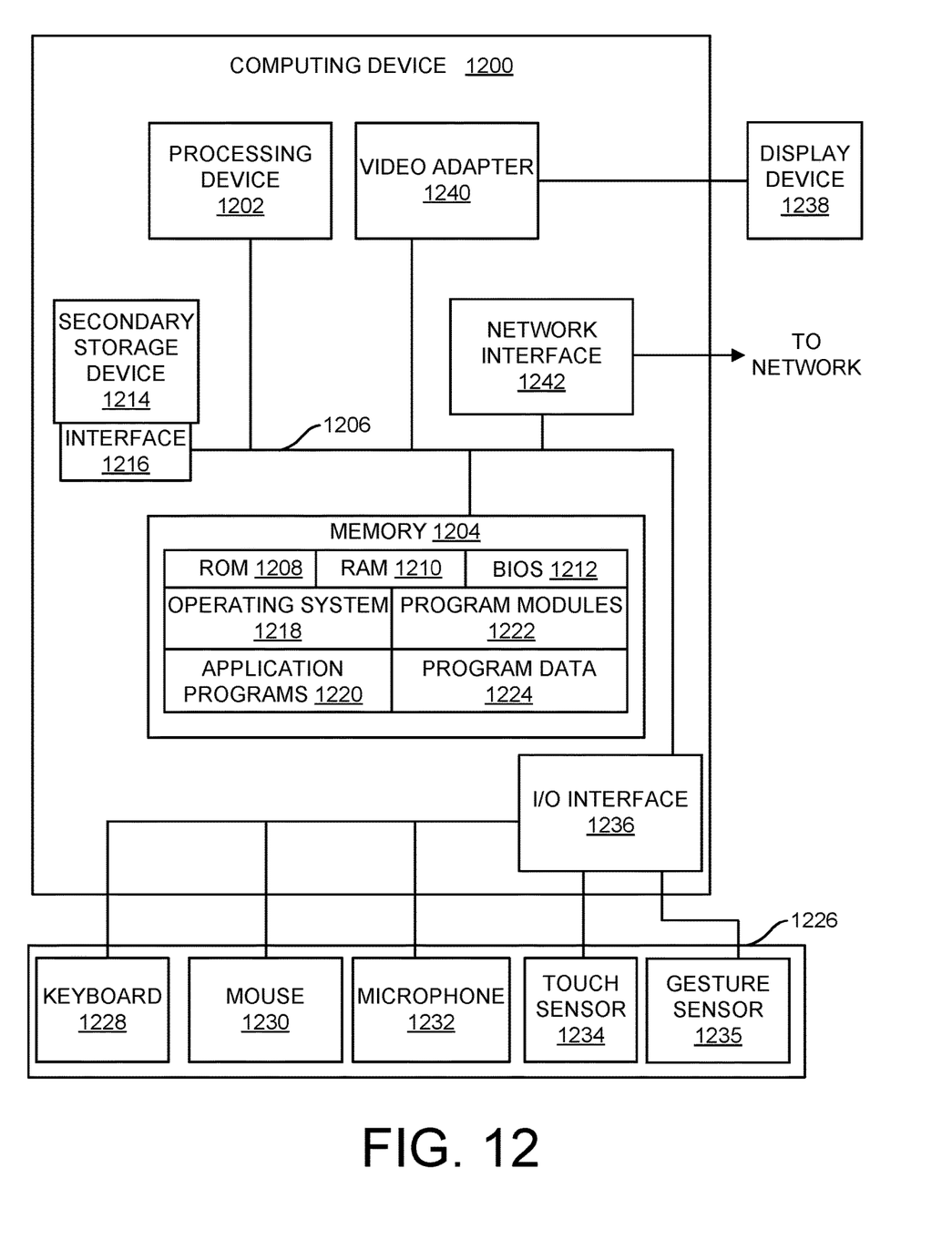
FIG. 12 illustrates an example architecture of a computer system.

FIG. 12 illustrates an example architecture of a computing device 1200 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 12 can be used to execute the operating system, application programs, and/or software modules (including the software engines) described herein.

The computing device 1200 includes, in some embodiments, at least one processing device 1202 (e.g., a processor), such as a central processing unit (CPU). A variety of processing devices are available from a variety of manufacturers, for example, Intel or Advanced Micro Devices. In this example, the computing device 1200 also includes a system memory 1204, and a system bus 1206 that couples various system components including the system memory 1204 to the processing device 1202. The system bus 1206 is one of any number of types of bus structures that can be used, including, but not limited to, a memory bus, or memory controller; a peripheral bus; and a local bus using any of a variety of bus architectures.

Examples of computing devices that can be implemented using the computing device 1200 include a desktop computer, a laptop computer, a tablet computer, a mobile computing device (such as a smart phone, a touchpad mobile digital device, or other mobile devices), or other devices configured to process digital instructions.

The system memory 1204 includes read only memory 1208 and random access memory 1210. A basic input/output system 1212 containing the basic routines that act to transfer information within computing device 1200, such as during start up, can be stored in the read only memory 1208.

The computing device 1200 also includes a secondary storage device 1214 in some embodiments, such as a hard disk drive, for storing digital data. The secondary storage device 1214 is connected to the system bus 1206 by a secondary storage interface 1216. The secondary storage device 1214 and its associated computer readable media provide nonvolatile and non-transitory storage of computer readable instructions (including application programs and program modules), data structures, and other data for the computing device 1200.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1214 and/or system memory 1204, including an operating system 1218, one or more application programs 1220, other program modules 1222 (such as the software engines described herein), and program data 1224. The computing device 1200 can utilize any suitable operating system.

In some embodiments, a user provides inputs to the computing device 1200 through one or more input devices 1226. Examples of input devices 1226 include a keyboard 1228, mouse 1230, microphone 1232 (e.g., for voice and/or other audio input), touch sensor 1234 (such as a touchpad or touch sensitive display), and gesture sensor 1235 (e.g., for gestural input). In some implementations, the input device(s) 1226 provide detection based on presence, proximity, and/or motion. Other embodiments include other input devices 1226. The input devices can be connected to the processing device 1202 through an input/output interface 1236 that is coupled to the system bus 1206. These input devices 1226 can be connected by any number of input/output interfaces, such as a parallel port, serial port, game port, or a universal serial bus. Wireless communication between input devices 1226 and the input/output interface 1236 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1238, such as a monitor, liquid crystal display device, light-emitting diode display device, projector, or touch sensitive display device, is also connected to the system bus 1206 via an interface, such as a video adapter 1240. In addition to the display device 1238, the computing device 1200 can include various other peripheral devices (not shown), such as speakers or a printer.

The computing device 1200 can be connected to one or more networks through a network interface 1242. The network interface 1242 can provide for wired and/or wireless communication. In some implementations, the network interface 1242 can include one or more antennas for transmitting and/or receiving wireless signals. When used in a local area networking environment or a wide area networking environment (such as the Internet), the network interface 1242 can include an Ethernet interface. Other possible embodiments use other communication devices. For example, some embodiments of the computing device 1200 include a modem for communicating across the network.

The computing device 1200 can include at least some form of computer readable media. Computer readable media includes any available media that can be accessed by the computing device 1200. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1200.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 12 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 1200 can be characterized as an ADAS computer. For example, the computing device 1200 can include one or more components sometimes used for processing tasks that occur in the field of artificial intelligence (AI). The computing device 1200 then includes sufficient proceeding power and necessary support architecture for the demands of ADAS or AI in general. For example, the processing device 1202 can include a multicore architecture. As another example, the computing device 1200 can include one or more co-processors in addition to, or as part of, the processing device 1202. In some implementations, at least one hardware accelerator can be coupled to the system bus 1206. For example, a graphics processing unit can be used. In some implementations, the computing device 1200 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An occupant monitoring system for a vehicle, the occupant monitoring system comprising:
    a first light source to generate first infrared (IR) light illuminating at least part of the body of an occupant of a vehicle, wherein the first light source is time modulated with a duty cycle, wherein the first light source is a vertical-cavity surface-emitting laser (VCSEL), wherein the VCSEL generates non-IR light together with the first IR light, the occupant monitoring system further comprising a filter for a first IR camera to remove reflections of the non-IR light, wherein the occupant monitoring system reduces capture of ambient light by a limited duration, gated exposure in which an overcurrent is provided so that the VCSEL operates at peak power of at least about 100 times a continuous average output for which the VCSEL is rated;
    an IR reflective surface to reflect second IR light reflected from the body of the occupant; and
    the first IR camera, the first IR camera to receive at least part of the second IR light reflected by the IR reflective surface, wherein the first IR camera is time modulated with the duty cycle of the first light source.

2. The occupant monitoring system of claim 1, further comprising an occupant monitoring component that processes an output of the first IR camera, the occupant monitoring component implemented by at least one processor executing instructions stored in at least one memory.

3. The occupant monitoring system of claim 2, wherein the occupant monitoring component performs distortion compensation to the output.

4. The occupant monitoring system of claim 2, wherein the output of the first IR camera covers all front-row passengers of the vehicle.

5. The occupant monitoring system of claim 2, further comprising:
    a second light source to generate third IR light illuminating at least part of the body of the occupant, wherein each of the first and third IR light includes a dot pattern; and
    a second IR camera to receive fourth IR light reflected by the IR reflective surface, wherein the occupant monitoring component processes a three-dimensional image of the occupant based on the second and fourth IR lights.

6. The occupant monitoring system of claim 4, wherein the first IR camera has a fisheye lens.

7. The occupant monitoring system of claim 1, wherein at least the first IR camera is centrally positioned in a transverse direction of an instrument panel of the vehicle.

8. The occupant monitoring system of claim 1, wherein at least the first IR camera is off-centrally positioned in a transverse direction of an instrument panel of the vehicle.

9. The occupant monitoring system of claim 8, wherein the off-central position is aligned with the occupant in the transverse direction of the instrument panel.

10. The occupant monitoring system of claim 8, wherein the occupant is a driver of the vehicle, and wherein the off-central position is aligned with a passenger in the transverse direction of the instrument panel.

11. The occupant monitoring system of claim 1, wherein the IR reflective surface is positioned at a location on a windshield of the vehicle.

12. The occupant monitoring system of claim 11, wherein the IR reflective surface comprises a film or coating applied to the windshield.

13. The occupant monitoring system of claim 12, wherein the film or coating is a thermal control film or coating applied to the windshield.

14. The occupant monitoring system of claim 12, wherein the vehicle includes a head-up display (HUD) system, wherein the HUD system presents a HUD at the location on the windshield, and wherein the occupant monitoring system is integrated with the HUD system in a common system.

15. The occupant monitoring system of claim 1, wherein the first light source is an IR light source.

16. The occupant monitoring system of claim 1, wherein the occupant monitoring system further comprises a curved cover lens for the IR camera.

17. The occupant monitoring system of claim 1, wherein at least the first IR camera is installed at an instrument panel of the vehicle.

18. The occupant monitoring system of claim 17, wherein the first IR camera is installed in a well of the instrument panel, the well facing toward a windshield of the vehicle.

19. The occupant monitoring system of claim 18, wherein the occupant monitoring system further comprises flocking or a glare trap in the well.

20. The occupant monitoring system of claim 17, wherein the vehicle has a display device mounted to the instrument panel, and wherein the display device blocks a view of the first IR camera for the occupant.

21. The occupant monitoring system of claim 1, wherein the first IR light is polarized.

22. The occupant monitoring system of claim 1, wherein the first IR light comprises a pseudorandom point pattern.

23. The occupant monitoring system of claim 1, wherein the first IR camera is inside or on an instrument panel of the vehicle, and wherein the first light source is positioned elsewhere inside the vehicle than at the instrument panel.

24. The occupant monitoring system of claim 1, wherein the occupant monitoring system is configured for adjusting a field of view of the first IR camera based on a height of the occupant.

25. The occupant monitoring system of claim 1, wherein the IR reflective surface includes a surface of the vehicle other than a windshield.

26. The occupant monitoring system of claim 1, wherein the occupant monitoring system is configured for changing an aspect regarding the first IR light or the IR reflective surface.

27. The occupant monitoring system of claim 26, wherein the occupant (Original) monitoring system changes an intensity of the first IR light, or a tint of the IR reflective surface.

28. The occupant monitoring system of claim 26, wherein the occupant monitoring system changes the aspect based on at least one of weather information, map information, a navigation signal, or an output of an exterior camera of the vehicle.

29. The occupant monitoring system of claim 1, further comprising a second IR camera, wherein the first and second IR cameras are positioned symmetrically with respect to the occupant.

30. The occupant monitoring system of claim 1, wherein the continuous average output for which the VCSEL is rated is about 0.5 W, and wherein the peak power is about 50W.

31. The occupant monitoring system of claim 1, wherein the duty cycle is about 30 milliseconds (ms), wherein the occupant monitoring system performs camera integration for only about 1 ms of the duty cycle, and wherein the occupant monitoring system integrates only about 3% of the ambient light and about 100% of the at least part of the second IR light received by the first IR camera.

* * * * *